United States Patent
Day et al.

(10) Patent No.: US 9,019,683 B2
(45) Date of Patent: Apr. 28, 2015

(54) SEAL WITH ENERGY-ABSORBING FILLER AND METHOD OF MANUFACTURE

(71) Applicant: The Boeing Company, Chicago, IL (US)

(72) Inventors: Arthur C. Day, Seattle, WA (US); James P. Irwin, Renton, WA (US); Eddie Kwon, Seattle, WA (US); Carl R. McIver, Everett, WA (US); Kevin E. McCrary, Graham, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/260,763

(22) Filed: Apr. 24, 2014

(65) Prior Publication Data

US 2014/0235083 A1    Aug. 21, 2014

Related U.S. Application Data

(62) Division of application No. 13/325,190, filed on Dec. 14, 2011, now Pat. No. 8,717,735.

(51) Int. Cl.
| | |
|---|---|
| *H05F 3/00* | (2006.01) |
| *H01R 43/20* | (2006.01) |
| *F16J 15/14* | (2006.01) |
| *F16L 25/03* | (2006.01) |
| *F16J 15/06* | (2006.01) |
| *H01R 13/52* | (2006.01) |
| *F16L 47/22* | (2006.01) |

(52) U.S. Cl.
CPC ................. *H01R 43/20* (2013.01); *F16J 15/14* (2013.01); *F16L 25/03* (2013.01); *F16J 15/064* (2013.01); *H01R 13/5216* (2013.01); *F16L 47/22* (2013.01)

(58) Field of Classification Search
CPC .... H01R 43/20; H01R 13/5216; F16J 15/064; F16J 47/22
USPC .......................................................... 361/218
See application file for complete search history.

(56) References Cited

U.S. PATENT DOCUMENTS

| 2,710,113 A | 6/1955 | Pritchard |
| 2,924,546 A | 2/1960 | Shaw |

(Continued)

FOREIGN PATENT DOCUMENTS

| CH | 538628 | 6/1973 |
| DE | 102004023656 | 11/2005 |

(Continued)

OTHER PUBLICATIONS

European Search Report, European Application No. 12195497.8 (Mar. 13, 2013).

(Continued)

*Primary Examiner* — Ronald W Leja
(74) *Attorney, Agent, or Firm* — Thompson Hine LLP

(57) ABSTRACT

A method for sealing an interface to attenuate high energy currents and voltages traveling thereacross may include forming a cover defining an inner volume shaped to enclose the interface; forming a filled sealant including a semi-rigid sealant mixed with a filler having a multiplicity of discrete particles of different composition than the semi-rigid sealant; placing the filled sealant within the inner volume; and placing the cover containing the filled sealant over the interface such that the filled sealant is adjacent the interface.

20 Claims, 1 Drawing Sheet

(56) References Cited

U.S. PATENT DOCUMENTS

| | | |
|---|---|---|
| 4,174,124 A | 11/1979 | Dockree |
| 4,382,049 A | 5/1983 | Hofmeister et al. |
| 4,786,086 A | 11/1988 | Guthrie et al. |
| 4,897,143 A | 1/1990 | Covey |
| 4,905,931 A | 3/1990 | Covey |
| 5,131,688 A | 7/1992 | Tricini |
| 5,260,100 A | 11/1993 | Day |
| 5,702,111 A * | 12/1997 | Smith ............... 277/650 |
| 6,467,545 B1 | 10/2002 | Venkataraman et al. |
| 8,181,327 B2 | 5/2012 | Apfel |
| 2006/0078399 A1 | 4/2006 | Coddington et al. |
| 2012/0201627 A1 | 8/2012 | Apfel |
| 2012/0326433 A1 | 12/2012 | Rorabaugh et al. |
| 2013/0153136 A1 | 6/2013 | Day et al. |

FOREIGN PATENT DOCUMENTS

| | | |
|---|---|---|
| EP | 0133337 | 2/1985 |
| EP | 0217313 | 4/1987 |
| FR | 1009262 | 5/1952 |
| GB | 1295176 | 11/1972 |
| GB | 1295590 | 11/1972 |
| KR | 2003094672 | 12/2003 |
| WO | 2005/095828 | 10/2005 |

OTHER PUBLICATIONS

English translation of DE 102004023656, Buenning, Ralf-Peter (published Nov. 17, 2005).

U.S. Appl. No. 13/325,190, Office Action (Sep. 12, 2013).

U.S. Appl. No. 13/325,190, Notice of Allowance (Dec. 24, 2013).

\* cited by examiner

SEAL WITH ENERGY-ABSORBING FILLER AND METHOD OF MANUFACTURE

FIELD

The present disclosure relates to seals for enclosing and protecting joints and other part connections, and more particularly to seals made of semi-rigid sealant that provide spark attenuation and energy absorption for joints and other part connections.

BACKGROUND

Certain aspects of vehicle structures, such as the structural components of aircraft, must be made resistant to the energy typically generated by sparking and arcing resulting from transient events, such as a lightning strike. For example, structures such as aircraft fuel tanks may enclose a combustible atmosphere. Such structures must maintain integrity and cannot transmit electrical transients that might create sparks in the combustible atmosphere. Wing fuel tanks on an aircraft may have literally thousands of structural fasteners protruding into the fueled volume. A fuel tank may be defined by discrete plates joined together. Such structural fasteners and structural joints between plates must be enclosed by seals that are capable of withstanding high electrical transient currents that may result from lightning strikes, or from faults or shorts in the aircraft electrical system, without emitting an arc or spark into the tank that can be an ignition source.

Other types of structures, such as hydraulic and fuel lines on an aircraft, also must maintain their integrity and not transmit arcs or sparks into the interiors of the fuel tanks and lines. For example, hydraulic fittings are widely used in aircraft and other vehicles and applications. Such fittings may be placed over two or more tubes to be joined and mechanically swaged to make a fluid-tight joint.

With the transitioning of aircraft structural components from metal to non-metal composites, the lines of hydraulic control systems on such aircraft have been utilized as current carrying means for dissipating electrical energy from lightning strikes. The hydraulic lines also may serve as part of a current return network that is used for grounding electrical systems and discharging electrical energy from the aircraft.

One potential consequence of passing high levels of current through hydraulic lines as part of the current return network is that arcing might occur between a hydraulic line and a fitting. The Federal Aviation Administration (FAA) has recognized this risk and promulgated Federal Aviation Regulation (FAR) 25.981(a)(3) (14 C.F.R. §25.981(a)(3)) that requires any potential ignition source in a fuel tank to be sufficiently contained by redundant ignition prevention measures.

A solution to this sparking problem is described in U.S. application Ser. No. 13/167,809 filed Jun. 24, 2011 titled "Apparatus for Preventing Spark Propagation", the contents of which are incorporated herein by reference. The apparatus described therein prevents spark propagation from a fitting to a high-risk zone by means of a cover or wrap that provides a physical barrier between the fitting and the high-risk zone.

In addition to preventing the spark from travelling from the spark location, which may include a lightning strike, to a high-risk zone, it is also desirable to eliminate the risk of sparking entirely by absorbing the energy discharged when the spark occurs. One solution for mitigating this risk is the use of a sealant, such as a sealant meeting Aerospace Material Standard (AMS) AMS3281 rev. E, published by the SAE (Society of Automotive Engineers) specifications. Such sealants are electrically resistant, polysulfide-based, low-density, high-temperature resistant material that may be applied in paste form. Such sealants, such as PR-1776M Class B Low Weight Fuel Tank Sealant provided by PPG Aerospace, are used not only as a fuel tank sealant but as a sealant for other aircraft fuselage sealing applications, and as a sealant between a fitting and a cover or wrap.

Sealants meeting the AMS3281 rev. E specifications are resistant to fuel and hold up in the aircraft environment. Such sealants may be used for pre-cured fastener caps that are attached to fasteners that pierce an aircraft fuel tank. When such sealants are exposed to normal temperatures, the material is pliable and able to absorb a large amount of energy. However, at colder temperatures (e.g., −60 to −80° F.) the material may become brittle and may fail when exposed to high pressure gases, such as from electrical sparking. In addition to embrittlement, the sealant, even in pliable form, behaves as an incompressible fluid. A lightning strike can cause an expanding bubble of gas which must not be allowed to create a path to the fuel tank. Sizing a seal to prevent such paths increases its size, weight, and cost.

Therefore, there is a need for a seal for joints and fittings that may function in combustible atmospheres. There is a need for seals and fittings having increased energy-absorbing qualities that provide resistance to high transient pressures within joints and attenuate sparking and electrical discharges from transient voltages, and maintain integrity and flexibility over a wide temperature range. There is also a need for such fittings to absorb the gas volume generated by a short pulse of high current, such as a lightning-induced spark.

SUMMARY

In one embodiment, a seal for attenuating energy from an electrical discharge across an interface includes a cover defining an inner volume shaped to enclose the interface, and a filled sealant including a semi-rigid sealant mixed with a filler having a multiplicity of discrete particles of different composition that the semi-rigid sealant contained within the inner volume such that the filled sealant is adjacent the interface when the cover is placed over the interface. In another embodiment, a method for sealing an interface to attenuate high energy currents and voltages traveling thereacross includes forming a cover defining an inner volume shaped to enclose the interface, forming a filled sealant including a semi-rigid sealant mixed with a filler having a multiplicity of discrete particles of different composition than the semi-rigid sealant; placing the filled sealant within the inner volume, and placing the cover containing the filled sealant over the interface such that the filled sealant is adjacent the interface.

In another embodiment, a method for sealing an interface to attenuate high energy currents and voltages traveling thereacross may include forming a cover defining an inner volume shaped to enclose the interface; forming a filled sealant including a semi-rigid sealant mixed with a filler having a multiplicity of discrete particles of different composition than the semi-rigid sealant; placing the filled sealant within the inner volume; and placing the cover containing the filled sealant over the interface such that the filled sealant is adjacent the interface.

In yet another embodiment, a method for sealing an interface to attenuate high energy currents and voltages traveling thereacross may include forming a cover defining an inner volume shaped to enclose the interface; forming a filled sealant including a semi-rigid sealant mixed with a filler having a multiplicity of discrete particles of different composition than the semi-rigid sealant; placing the filled sealant over the interface; and placing the cover over the filled sealant.

In yet another embodiment, a seal for attenuating energy from an electrical discharge across an interface may include a cover defining an inner volume shaped to enclose the interface; a sealant contained within the inner volume; and a filled sealant including a semi-rigid sealant mixed with a filler having a multiplicity of discrete particles of different composition than the semi-rigid sealant, the filled sealant positioned to connect the cover to the interface.

In still another embodiment, a seal for attenuating energy from an electrical discharge across an interface between a fastener and an aircraft fuel tank panel may include a capseal defining an inner volume shaped to enclose a protruding portion of the fastener and the interface, and a filled sealant including a semi-rigid sealant mixed with a filler having a multiplicity of discrete particles of different composition than the semi-rigid sealant. The filled sealant may be contained within the inner volume of the capseal such that the filled sealant substantially covers the interface and a protruding portion of the fastener when the cover is placed over the fastener and interface, such that the filled sealant may attach the cover to the fastener and aircraft fuel tank panel. Preferably, the particles are selected such that the crush strength of the particles is less than the strength of the sealant throughout the operating temperature range of the seal.

Preferably, the particles used to form the filled sealant are selected to have a crush or burst strength less than the strength of the sealant component across the operating temperature range of the seal. Such particles will absorb the energy in the form of expanding gases resulting from a lightning strike or other high voltage discharge and be crushed, leaving the sealant component substantially intact. This property is particularly desirable when the seal is subjected to temperatures at the low end of the operating temperature range because the sealant component may substantially lose its elastic properties and become relatively brittle and less able to absorb energy before failure.

The features, functions, and advantages that have been discussed can be achieved independently in various embodiments of the present invention or may be combined in yet other embodiments further details of which can be seen with reference to the following description and drawings.

DETAILED DESCRIPTION

Figure 1:
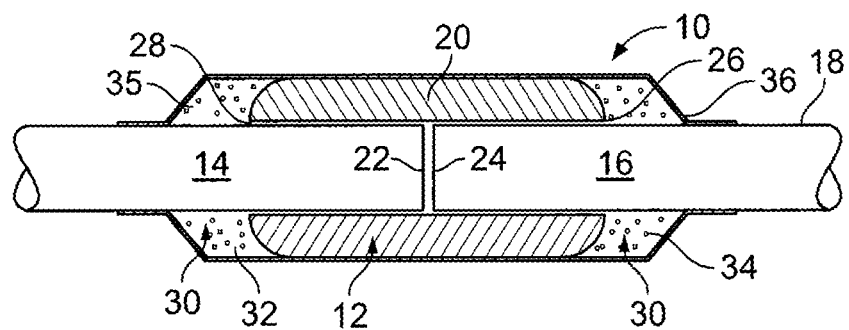
FIG. 1 is a schematic, side elevation in section of the disclosed seal applied to a swaged butt joint.

The disclosed seal may utilize a filled sealant. The filled sealant may include a polysulfide sealant, and more particularly a polysulfide sealant that meets Aerospace Material Standard (AMS) AMS3281 rev E, published by the SAE (Society of Automotive Engineers). One example of such a sealant is PR-1776 Class B Low Weight Fuel Tank Sealant manufactured by PPG Industries, Inc., Pittsburgh Pa. That sealant may be a thermoplastic paste that cures to form a flexible seal and adheres well to aircraft surfaces, including coated and uncoated metals, composite structure, and internal structural components. That thermoplastic paste may be created by mixing a two-part, manganese dioxide-cured Permapol® (a registered trademark of PRC-Desoto International, Inc. of Sylmar, Calif.) P-5 modified polysulfide. The two components may be mixed at a predetermined ratio (for example about 1:10, by weight) to create a low-sag, thixotropic paste that cures at room temperature (about 70° F.) and adheres readily to common aircraft substrates. The uncured material is a low-sag, thixotropic paste suitable for application by extrusion gun or spatula.

At relatively high temperatures, for example from room temperature to the upper end of the operating temperature of the sealant (about 160° F.), the material is flexible and exhibits a high degree of strain before failure (300-400%). However, at relatively low temperatures, for example at the lower end of operating temperature of the sealant (about −60 to −80° F.), the material is more brittle and exhibits a low degree of flexibility before reaching an ultimate tensile or failure strength of over 3000 pounds per square inch (psi). While this level of stress may be substantially higher than the stress required for failure of the same material at high temperatures (where it has an ultimate tensile strength of a few hundred psi), the total amount of energy and expanding gas volume absorbed by the material at higher temperatures is substantially greater. The amount of energy absorbed is proportional to the strain energy of the material. The strain energy is equal to the integral of the stress-strain curve for the sealant. At room temperature (about 70° F.), the sealant may absorb up to 10 times the total energy that the cold sealant may absorb before reaching its ultimate tensile strength. While strain energy of the material may be one aspect of the disclosure, the ability of the material to absorb an expanding volume of gas also may be beneficial.

According to one aspect, the disclosed seal may utilize a filled sealant that may include the aforementioned sealant mixed with a filler having a substantially temperature-independent failure strength, at least within the operating range of the sealant. The resulting filled sealant may have increased energy-absorbing characteristics compared to sealant alone. In other words, the filled sealant may be capable of absorbing more energy from shock loading or stress before failure than sealant alone, especially at lower operating temperatures. In one aspect, the filler may consist of discrete particles.

The particles may include, for example, hollow glass microspheres having a fracture strength of less than about 3000 psi. According to one embodiment, the microspheres may comprise about 10-40%, by weight of the filled sealant. While other ratios may be employed, it is believed that such a ratio facilitates spreading and applying the filled sealant. When added to the sealant to form the disclosed filled sealant, the hollow glass microspheres may reduce the overall weight of the filled sealant, increase the viscosity of the filled sealant and reduce the cost of the filled sealant when compared to a comparable volume of sealant without filler particles.

An example of such hollow glass microspheres is sold under the brand "qk300" manufactured by Sun Microsphere Co., Ltd. of Hebei, China. The microspheres may provide a first failure mechanism that may prevent cracking or failure of the sealant under cold conditions. These microspheres may range in diameter from about 45-300 microns and have a crush strength of about 2500 psi. These microspheres are available as a powder and therefore may be effectively mixed with and dispersed throughout the two-part sealant to make the filled sealant.

Other filler materials are also contemplated, such as cenospheres, ceramic and polymer microballoons, and solid plastic spheres. The filler particles may be generally spherical in shape, but other shapes, whether homogeneous or heterogeneous, are contemplated. The disclosed filled sealant may absorb more energy and be less likely to fail or rupture, especially at low operating range temperatures, in response to pressure resulting from rapid heating in response to arcing or lightning strikes. The spheres preferably have a small size, 0.001"-0.020" (25.4 μm-508 μm) diameter, although granular filler material of other sizes (both larger and smaller), shapes and materials may be employed.

Unlike air-bubbles in an open or closed-cell foam product, glass microspheres will not vary in size with external pressure and will not explode, implode, or collapse when external (ambient) pressure is low or high, respectively. Further, the glass microspheres are liquid impermeable, will not absorb fuel or moisture, and will maintain a consistent fracture strength over the designed operating temperature of the seal.

As shown in FIG. 1, in one aspect the disclosed seal, generally designated 10, may be used to attenuate energy from electrical sparks across a discontinuous interface, such as from a hydraulic tube or hose to a fitting, or from a surface to a fastener. A butt joint, generally designated 12, joins two sections of 14, 16 of, for example, a hydraulic line 18 (which may be either a tube or hose) as part of an aircraft control system. Alternately, line 18 may be a fuel line, such as for an aircraft fuel system. A cylindrical sleeve coupling 20 receives and may be swaged to the ends 22, 24 of the line sections 14, 16, respectively, to form the joint 12.

A potential arcing site 26 may exist at the juncture between the sleeve coupling 20 and the line section 16. Arcing might occur at 26 if a high voltage or current were to be impressed across the line segments 14, 16, and/or the coupling 20 and line segment 16. Similarly, a corresponding arcing site 28 may exist between the coupling sleeve 20 and the line section 14.

Filled sealant, generally designated 30, may be first prepared in the aforementioned manner, and applied about the joint 12 so that it covers at least the potential arcing sites 26, 28. The filled sealant 30 may include the aforementioned sealant 32 and a filler of energy-absorbing particles 34, such as hollow glass microspheres. The filled sealant 30 and coupling 20 may be covered with a wrap or sleeve 36, such as the sleeve described in the aforementioned U.S. patent application Ser. No. 13/167,809 filed Jun. 24, 2011 titled "Apparatus for Preventing Spark Propagation", or a shrink wrap layer. The filled sealant 30 may be placed in the inner volume 35 between the wrap 36 and the coupling 20 and line sections 14, 16 either by injecting the sealant beneath wrap or by applying the filled sealant about the joint 12 before applying the wrap to the joint 12.

Figure 2:
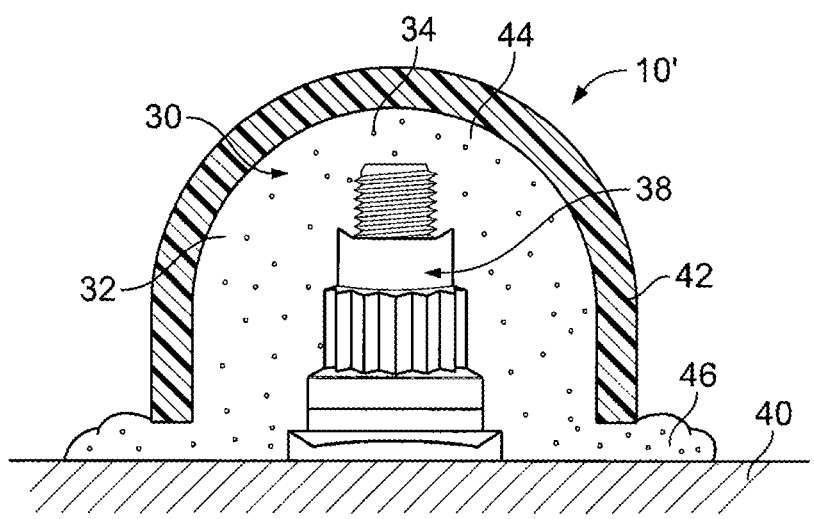
FIG. 2 is a schematic, side elevation in section of the disclosed seal applied to a cap seal.

As shown in FIG. 2, the disclosed seal, generally designated 10', may be shaped to enclose a fastener such as the screw, nut and washer combination 38 shown, protruding from a substrate that may take the form of a plate 40, which may form part of an aircraft fuel tank. The interface in this embodiment may be between the screw, nut and washer combination 38 and the plate 40. The seal 10' may include a capseal 42 that is generally cup-shaped and defines an interior volume 44 sized to cover the fastener 38. The inner volume 44 of the capseal 42 may be substantially filled with filled sealant 30 that may protrude at 46 between the capseal and the plate 40. The filled sealant adheres to, and thereby secures the capseal to, the plate over the fastener 38, as well as securing the capseal to the protruding portion of the fastener.

The capseal 42 may be made of relatively hardened sealant that is pre-cured and molded to a dimensionally stable shape before being applied to the seal 10'. In one aspect, the capseal 42 may be made of filled sealant as previously described, pre-cured and molded to shape before being applied to the seal 10'. In another aspect, the capseal 42 may be made of the aforementioned sealant 32 without filler 34. The seal 10' may be formed by first mixing the sealant 32 and filler particles 34 to make the filled sealant 30, partially filling the capseal 42 with filled sealant 30, then placing the capseal and sealant over the fastener 38. In an alternate aspect, the seal 10' may be formed by placing the capseal 42 over the fastener 38, then injecting the filled sealant 30 (having been pre-mixed as previously described) between the capseal and the fastener. In one aspect, the filled sealant 30 is prepared such that the filler particles 34 are distributed relatively uniformly throughout the sealant 32.

Figure 3:
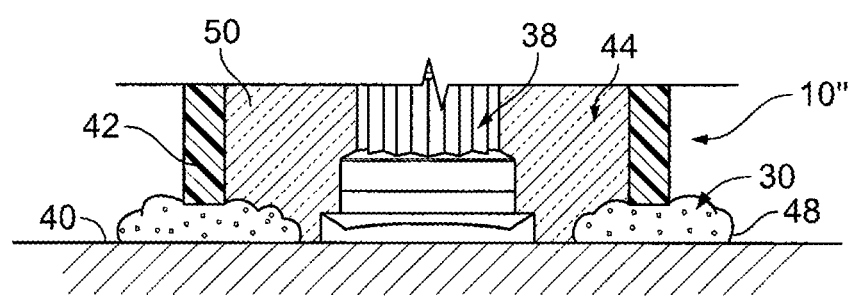
FIG. 3 is a detail showing a side elevation in section of an alternate embodiment of the disclosed seal as applied to a cap seal.

In another aspect, as shown in FIG. 3, a seal, generally designated 10", may include a capseal 42, as previously described with reference to FIG. 2, that may be attached to a plate 40 by a ring 48 of filled sealant 30 that may be deposited around fastener 38. The inner volume 44 of the capseal 42 may be filled substantially with sealant 50 that lacks filler 34. In another aspect, the ring 48 of filled sealant may be pre-molded and pre-cured prior to placement on the plate 40 about the fastener 38.

The disclosed filled sealant 30 may be molded and cured to provide dimensionally stable, preformed objects, such as caps 42 for isolating fasteners or rings 48 that may be applied around a fastener collar, that are pre-cured rather than cured in place. Such preformed objects, such as caps 42, may be formed by injecting a volume of sealant into a cavity and allowing the sealant to cure. The preformed objects may then be placed over hydraulic fittings to provide electrical isolation.

In one aspect, the filled sealant 30, in which the filler consisting of particles 34 may be glass microspheres or other energy-absorbing particles, may be provided with a lower volume of filler (for example <10%) than previously discussed in order to maintain a preferred viscosity level for injecting the filled sealant into a cavity for forming the preformed objects, while maintaining the energy-absorbing quality of the filled sealant.

With each embodiment 10, 10', 10", the filled sealant 30 is able to absorb energy resulting from arcing in the form of bursts of pressurized gas or metal vapor at joints and other interfaces, and absorb traveling sparks to a greater degree than semi-rigid filler alone. This increased capacity is believed to result from selecting filler having particles selected to have a lower resistance to failure (i.e., crush strength) than the sealant with which they are mixed, throughout the operating range of the sealant, and especially the cold strength of the sealant. A burst of pressurized gas may cause the particles, in one aspect hollow glass microspheres, to burst or be crushed, thus absorbing the energy of the burst and preventing failure of the sealant. The ability of the disclosed seal 10, 10', 10" to contain spark-induced gas expansion may be affected by the available volume created by contraction of the filler particles 34, plus the expansion of the capseal 42 or wrap 36 prior to rupture.

While the methods and forms of apparatus disclosed herein constitute preferred aspects of the disclosed shockwave attenuation apparatus and method, other methods and forms of apparatus may be employed without departing from the scope of the invention. It is within the scope of the disclosure to apply the filled sealant 30 to insulate other types of conduit connections and structures where sparking may lead to combustion of the volatile contents of the conduits or structures. For example, the filled sealant 30 may be used to seal joints and connectors of fuel tanks on fixed or mobile platforms.

What is claimed is:

1. A method for sealing an interface to attenuate high energy currents and voltages traveling thereacross, the method comprising:
   forming a cover defining an inner volume shaped to enclose the interface;
   forming a filled sealant including a semi-rigid sealant mixed with a filler having a multiplicity of discrete particles of different composition than the semi-rigid sealant, the discrete particles having a crush strength less than that of the semi-rigid sealant;
   placing the filled sealant within the inner volume; and
   placing the cover containing the filled sealant over the interface such that the filled sealant is adjacent the interface.

2. The method of claim 1, wherein the cover forming step includes forming the cover of one of the semi-rigid sealant and the filled sealant.

3. The method of claim 1, wherein the cover forming step includes the step of forming a cover selected from a capseal and a wrap.

4. The method of claim 1, wherein the filled sealant forming step includes the step of selecting particles having a crush strength less than that of the semi-rigid sealant throughout an operating range of the sealant.

5. The method of claim 1, wherein the particles are selected from a group consisting of microspheres, hollow glass beads, cenospheres, ceramic microballoons, polymer microballoons and solid plastic spheres, and combinations thereof.

6. The method of claim 4, wherein the selecting step includes the step of selecting particles having a crush strength of less than approximately 3000 pounds per square inch.

7. The method of claim 6, wherein the step of selecting particles having a crush strength of less than about 3000 pounds per square inch includes mixing the particles to make up between about 10 percent and about 40 percent by weight of the filled sealant.

8. The method of claim 1, wherein the interface is a potential arcing site.

9. A method for sealing an interface to attenuate high energy currents and voltages traveling thereacross, the method comprising:
   forming a cover defining an inner volume shaped to enclose the interface;
   forming a filled sealant including a semi-rigid sealant mixed with a filler having a multiplicity of discrete particles of different composition than the semi-rigid sealant, the particles having a crush strength less than that of the semi-rigid sealant;
   placing the filled sealant over the interface; and
   placing the cover over the filled sealant.

10. The method of claim 9, wherein the cover forming step includes the step of forming a cover selected from a capseal and a wrap.

11. The method of claim 9, wherein the filled sealant forming step includes the step of selecting particles having a crush strength less than that of the semi-rigid sealant throughout an operating range of the semi-rigid sealant.

12. The method of claim 9, wherein the particles are selected from a group consisting of microspheres, hollow glass beads, cenospheres, ceramic balloons, polymer microballoons and solid plastic spheres, and combinations thereof.

13. The method of claim 12, wherein the further comprising selecting particles to have a crush strength less than about 3000 pounds per square inch.

14. The method of claim 13, wherein selecting particles having a crush strength of less than about 3000 pounds per square inch includes mixing the particles with the semi-rigid sealant to make up between about 10 percent and about 40 percent by weight of the filled sealant.

15. The method of claim 9, wherein the interface is a potential arcing site.

16. A seal for attenuating energy from an electrical discharge across an interface, the seal comprising:
   a cover defining an inner volume shaped to enclose the interface;
   a sealant contained within the inner volume; and
   a filled sealant including a semi-rigid sealant mixed with a filler having a multiplicity of discrete particles of different composition than the semi-rigid sealant, the discrete particles having a crush strength less than that of the semi-rigid sealant, the filled sealant positioned to connect the cover to the interface.

17. The seal of claim 16, wherein the filled sealant is adjacent the interface when the cover is placed over the interface.

18. The seal of claim 17, wherein the filled sealant is in the form of a ring about the interface, positioned to connect the cover to the interface.

19. The seal of claim 16, wherein the sealant contained within the inner volume lacks a filler.

20. The seal of claim 16, wherein the discrete particles have a crush strength less than that of the semi-rigid sealant throughout the operating range of the semi-rigid sealant.

* * * * *